(12) United States Patent
Iijima (10) Patent No.: US 9,158,111 B2
(45) Date of Patent: Oct. 13, 2015

(54) OPTICAL SCANNING DEVICE AND IMAGE FORMING APPARATUS WITH BEAM SWITCHING ELEMENT

(75) Inventor: Masayuki Iijima, Okazaki (JP)

(73) Assignee: KONICA MINOLTA, INC., Tokyo (JP)

(*) Notice: Subject to any disclaimer, the term of this patent is extended or adjusted under 35 U.S.C. 154(b) by 54 days.

(21) Appl. No.: 13/160,159

(22) Filed: Jun. 14, 2011

(65) Prior Publication Data

US 2011/0310454 A1    Dec. 22, 2011

(30) Foreign Application Priority Data

Jun. 18, 2010  (JP) .................................. 2010-139060

(51) Int. Cl.
- G02B 26/08 (2006.01)
- G02B 26/12 (2006.01)
- G02B 26/10 (2006.01)

(52) U.S. Cl.
CPC ............ G02B 26/123 (2013.01); G02B 26/127 (2013.01); *G02B 26/10* (2013.01)

(58) Field of Classification Search
CPC .. G02B 26/10; G02B 26/0841; G02B 26/085; G02B 26/0816; G02B 26/0833; G02B 26/121–26/127; G02B 26/101–26/108; G02B 26/02; G02B 26/067; G02B 26/004; G02B 6/3556; G02B 5/09; G02B 13/0005; G02B 17/0848; G02B 17/023; G02B 27/0031; G01N 21/0303; G01N 21/031; H04N 9/3129; H04N 1/502; H04N 1/40037; H04N 1/1135; H04N 1/12; H04N 2/08; G01S 17/74; B41J 2/471; A61B 3/015; B23K 26/027; G11B 7/0037; G11B 23/40; G06K 15/1214; B82Y 20/00; B82Y 15/00

See application file for complete search history.

(56) References Cited

U.S. PATENT DOCUMENTS

| | | | |
|---|---|---|---|
| 5,812,299 A * | 9/1998 | Minakuchi et al. ........ | 359/216.1 |
| 6,111,633 A * | 8/2000 | Albert et al. .................. | 349/196 |
| 2002/0089625 A1* | 7/2002 | Grupp ............................ | 349/110 |
| 2010/0060710 A1* | 3/2010 | Kubo ............................ | 347/224 |

FOREIGN PATENT DOCUMENTS

| | | |
|---|---|---|
| JP | 2002-40350 | 2/2002 |
| JP | 2004-268360 | 9/2004 |
| JP | 2006-261494 | 9/2006 |
| JP | 2010-54590 | 3/2010 |
| JP | 2010-210916 | 9/2010 |

OTHER PUBLICATIONS

Notification of Reasons for Refusal mailed May 1, 2012, directed to Japanese Application No. 2010-139060; 7 pages.

* cited by examiner

*Primary Examiner* — Stephone B Allen
*Assistant Examiner* — Jyotsna Dabbi
(74) *Attorney, Agent, or Firm* — Holtz, Holtz, Goodman & Chick PC (57) ABSTRACT

An optical scanning device for scanning a photoreceptor surface with beams includes a light source that emits multiple beams in one direction, a deflector for deflecting the beams, a detector for detecting light intensities of the beams, and a switch for switching travel routes of the beams between a first route leading from the light source to the deflector and a second route leading from the light source to the detector.

4 Claims, 8 Drawing Sheets

OPTICAL SCANNING DEVICE AND IMAGE FORMING APPARATUS WITH BEAM SWITCHING ELEMENT

This application is based on Japanese Patent Application No. 2010-139060 filed on Jun. 18, 2010, of which content is incorporated herein by reference.

BACKGROUND OF THE INVENTION

1. Field of the Invention

The present invention relates to an optical scanning device and an image forming apparatus, and more particularly to an optical scanning device for scanning a photoreceptor surface with beams and to an image forming apparatus having the optical scanning device.

2. Description of Related Art

A scanning device disclosed by Japanese Patent Laid-Open Publication No. 2002-40350 is well known as a conventional optical scanning device. This scanning device has a surface-emitting laser, a rotative polygon mirror, a half mirror, a light receiving element and a control section, and this device is adapted to scan a photosensitive drum with a plurality of beams concurrently.

The surface-emitting laser emits a plurality of beams. The rotative polygon mirror deflects the plurality of beams to permit the beams to be scanned on the photosensitive drum. The half mirror is located between the surface-emitting laser and the rotative polygon mirror and reflects part of each of the beams. The light receiving element receives the beams reflected from the half mirror and outputs signals with voltages corresponding to the light intensities of the reflected beams. The control section controls the surface-emitting laser based on the signals outputted from the light receiving element. This permits feedback control of the output of the surface-emitting laser.

In the optical scanning device disclosed by Japanese Patent Laid-Open Publication No. 2002-40350, each of the plurality of beams is partly reflected from the half mirror to the light receiving element. Therefore, the light intensity of each beam deflected by the rotative polygon mirror is lower than the light intensity immediately after the beam was emitted from the surface-emitting laser by the light intensity reflected from the half mirror. Thus, the light intensity of the beam deflected by the rotative polygon mirror is reduced, and the light intensity that is used as the base of generation of a main-scanning synchronizing signal is reduced. Consequently, the light intensity used for generation of a main-scanning synchronizing signal is insufficient, and it may be impossible to generate a main-scanning synchronizing signal accurately.

SUMMARY OF THE INVENTION

An object of the present invention is to provide an optical scanning device that prevents beams deflected by a deflector from reducing in light intensity and an image forming apparatus having the optical scanning device.

According to a first aspect of the present invention, an optical scanning device comprises: a light source that emits a plurality of beams in one direction; a deflector for deflecting the beams; a detector for detecting light intensities of the beams; and a switch for switching travel routes of the beams between a first route leading from the light source to the deflector and a second route leading from the light source to the detector.

According to a second aspect of the present invention, an image forming apparatus comprises the optical scanning device above.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

An optical scanning device and an image forming apparatus according to an embodiment of the present invention will be hereinafter described with reference to the accompanying drawings.

Structure of the Image Forming Apparatus

Figure 1:
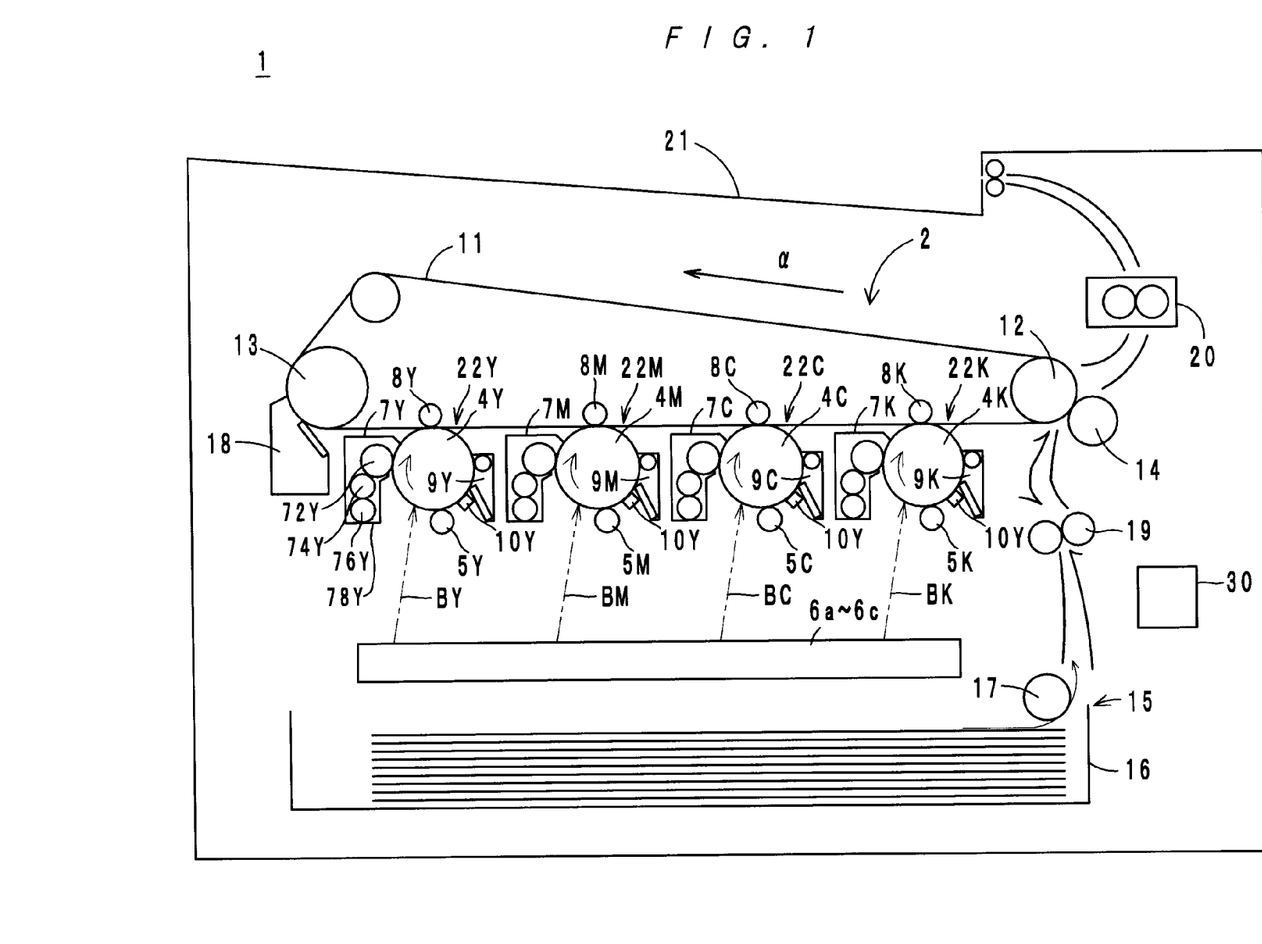
FIG. 1 is an illustration showing the general structure of an image forming apparatus.

An image forming apparatus provided with an optical scanning device according to an embodiment of the present invention is described with reference to the accompanying drawings. FIG. 1 shows the general structure of the image forming apparatus.

The image forming apparatus 1 is an electrophotographic color printer that combines images of four colors, namely, Y (yellow), M (magenta), C (cyan) and K (black) by a tandem method. The image forming apparatus forms an image on a sheet P in accordance with image data read by a scanner. The image forming apparatus 1, as shown by FIG. 1, comprises a printing section 2, a sheet feeding section 15, a pair of timing rollers 19, a fixing device 20, a printed-sheet tray 21 and a control section 30.

The control section 30 controls the operation of the whole apparatus 1, and the control section 30 is realized by a CPU. The sheet feeding section 15 feeds sheets P one by one, and the sheet feeding section 15 includes a sheet tray 16 and a feed roller 17. On the sheet tray 16, sheets to be subjected to printing are stacked. The feed roller 17 picks up sheets from the sheet tray 16 one by one. The pair of timing rollers 19 feeds each sheet P with precise timing so that a toner image can be transferred onto the sheet P in the printing section 2.

The printing section 2 forms a toner image on a sheet P fed from the sheet feeding section 15. The printing section 2 comprises image forming sections 22 (22Y, 22M, 22C and 22K), optical scanning devices 6 (6a to 6c), transferring sections 8 (8Y, 8M, 8C and 8K), an intermediate transfer belt 11, a driving roller 12, a driven roller 13, a secondary transfer roller 14 and a cleaning device 18. The image forming sections 22 (22Y, 22M, 22C or 22K) each comprise a photosensitive drum 4 (4Y, 4M, 4C or 4K), a charger 5 (5Y, 5M, 5C and 5K), a developing device 7 (7Y, 7M, 7C or 7K), a cleaner 9 (9Y, 9M, 9C or 9K) and an eraser 10 (10Y, 10M, 10C or 10K).

The chargers 5 charge the peripheral surfaces (scanned surfaces) of the photosensitive drums 4. The optical scanning devices 6 are controlled by the control section 30 to scan the peripheral surfaces of the photosensitive drums 4Y, 4M, 4C and 4K with beams BY, BM, BC and BK, respectively. Thereby, electrostatic latent images are formed on the photosensitive drums 4Y, 4M, 4C and 4K.

As shown in FIG. 1, the developing devices 7 (7Y, 7M, 7C and 7K) each comprises a developing roller 72 (72Y, 72M, 72C or 72K), a supplying roller 74 (74Y, 74M, 74C or 74K), a stirring roller 76 (76Y, 76M, 76C or 76K) and a container 78 (78Y, 78M, 78C or 78K). In FIG. 1, for simplification of the drawing, only the developing roller 72Y, the supplying roller 74Y, the stirring roller 76Y and the container 78Y of the developing device 7Y are provided with reference symbols.

The container 78 serves as the body of the developing device 7. The developing roller 72, the supplying roller 74 and the stirring roller 76 are housed in the container 78, and also toner is stored therein. The stirring roller 76 stirs the toner stored in the container 78 and charges the toner negatively. The supplying roller 74 supplies the negatively charged toner to the developing roller 72. The developing roller 72 supplies the toner to the photosensitive drum 4. More specifically, a negative bias voltage is applied to the developing roller 72 so as to form a development electric field between the photosensitive drum 4 and the developing roller 72, and by the effect of the electric field, the negatively charged toner is caused to move from the developing roller 72 to the photosensitive drum 4. In this moment, the toner sticks to the photosensitive drum 4 in accordance with the electrostatic latent image formed on the photosensitive drum 4. Thus, the electrostatic latent image on the photosensitive drum 4 is developed into a toner image.

The intermediate transfer belt 11 is stretched out between the driving roller 12 and the driven roller 13, and the toner image formed on the photosensitive drum 4 is transferred onto the intermediate transfer belt 11 (primary transfer). The transferring section 8 is disposed to face to the inner peripheral surface of the intermediate transfer belt 11, and a primary transfer voltage is applied to the transferring section 8 so that the toner image on the photosensitive drum 4 can be transferred onto the intermediate transfer belt 11. The cleaner 9 collects the residual toner from the photosensitive drum 4 after the first transfer. The eraser 10 erases the charge on the photosensitive drum 4. The driving roller 12 is rotated by an intermediate transfer belt driving section (not shown in FIG. 1) to drive the intermediate transfer belt 11 in a direction of arrow α. Thereby, the intermediate transfer belt 11 carries the toner image to a secondary transfer roller 14.

The secondary transfer roller 14, which is drum-shaped, faces to the intermediate transfer belt 11. A transfer voltage is applied to the secondary transfer roller 14 so that the toner image carried by the intermediate transfer belt 11 can be transferred to a paper sheet P traveling between the intermediate transfer belt 11 and the second transfer roller 14. More specifically, the driving roller 12 has the ground potential, and the intermediate transfer belt 11 has a positive potential near the ground potential because the intermediate transfer belt 11 is in contact with the driving roller 12. Then, a positive voltage that permits the potential of the secondary transfer roller 14 to become higher than those of the driving roller 12 and the intermediate transfer roller 11 is applied to the secondary transfer roller 14 as the transfer voltage. Thereby, an electric field is generated between the driving roller 12 and the secondary transfer roller 14, and by the effect of the electric field, the negatively charged toner image is transferred from the intermediate transfer belt 11 to the sheet P.

The cleaning device 18 removes toner remaining on the intermediate transfer belt 11 therefrom after the secondary transfer of the toner image to the sheet P.

The sheet P with the toner image transferred thereto is fed to the fixing device 20. The fixing device 20 performs a heating treatment and a pressure treatment toward the sheet P so as to fix the toner image on the sheet P. The sheet P that has been subjected to the printing process is ejected onto the printed-sheet tray 21.

First Embodiment

Structure of the Optical Scanning Device

Figure 2:
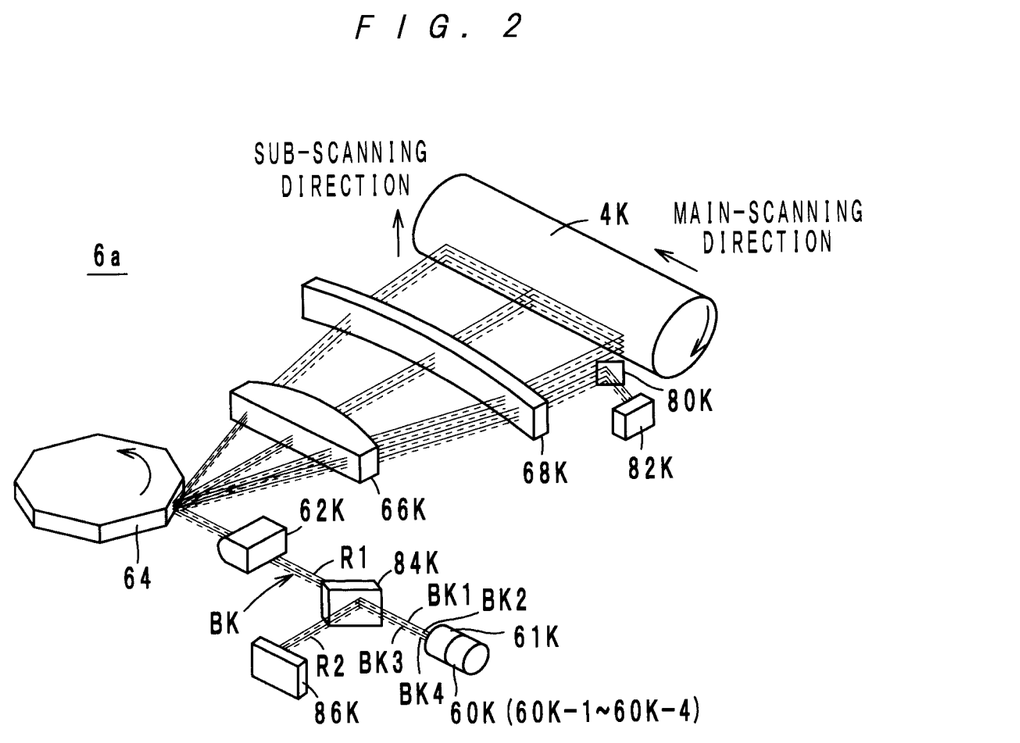
FIG. 2 is a perspective view of an optical scanning device according to a first embodiment.

The structure of an optical scanning device 6a according to a first embodiment of the present invention is hereinafter described with reference to the accompanying drawings. FIG. 2 is a perspective view of the optical scanning device 6a. FIG. 2 shows only the structure for irradiating the photosensitive drum 4K for black with beams BK. Also, the optical scanning device 6a actually has optical elements such as mirrors, but the optical elements are omitted from FIG. 2 to simplify the illustration. In the following paragraphs, scanning in the lengthwise direction of the photosensitive drum 4K is referred to as main scanning, and scanning in the direction in which the peripheral surface of the photosensitive drum 4K moves while the photosensitive drum 4K is rotating is referred to as sub scanning. The main scanning and the sub scanning are performed in orthogonal directions to each other. On a planar view facing to the traveling direction of the beams BK, the leftward direction is referred to as a main-scanning direction, and the upward direction is referred to as a sub-scanning direction.

The optical scanning device 6a comprises a light source 60K, a collimator lens 61K, a cylindrical lens 62K, a deflector 64, scanning lenses 66K, 68K, a mirror 80K, a sensor 82K, a reflective liquid crystal element (switching element) 84K and a sensor 86K. The optical scanning device 6a further comprises a control section 30 although it is not shown in FIG. 2.

The light source 60K is a surface-emitting laser (VCSEL) that emits beams BK1 to BK4 in one direction. More specifically, the light source 60K is a laminate semiconductor element formed of a plurality of semiconductor layers and has emission points 60K-1 to 60K-4. The light source 60K emits beams BK1 to BK4 that are diffusion lights only in one direction along the laminate direction of the semiconductor layers from the emission points 60K-1 to 60K-4, respectively. The beam BK1 is used for generation of a main-scanning synchronizing signal (SOS signal), and the beams BK2 to BK4 are used for formation of an electrostatic latent image. The emission points 60K-1 to 60K-4 are aligned in the sub-scanning direction, and also the beams BK1 to BK4 are aligned in the sub-scanning direction. In FIG. 1, the beam BK collectively means the beams BK1 to BK4.

The collimator lens 61K transforms the diffusion light beams BK1 to BK4 into parallel light beams. The cylindrical lens 62K causes the beams BK1 to BK4 to converge on reflecting surfaces of the deflector 64 with respect to the sub-scanning direction, so that the forms of the beams BK1 to BK4 become linear on the reflecting surfaces of the deflector 64.

The deflector 64 comprises a polygon mirror and a motor, and deflects the beams BK1 to BK4 in the main-scanning direction at an equiangular velocity. The scanning lenses 66K and 68K correct aberrations of the deflected beams BK1 to BK4. Then, the beams BK1 to BK4 are imaged on the peripheral surface of the photosensitive drum 4K. The photosensitive drum 4K is driven by a motor or any other driving device (not shown) to rotate at a specified constant velocity, so that the beams BK1 to BK4 imaged on the photosensitive drum 4K are scanned in the sub-scanning direction. In this way, by the main scanning and the sub scanning of the beams BK1 to BK4, a two-dimensional image (electrostatic latent image) is formed on the photosensitive drum 4K.

The mirror 80K is located near the main-scanning upstream end of the photosensitive drum 4K and reflects the beam BK1. The sensor 82K receives the beam BK1 reflected from the mirror 80K and generates a main-scanning synchronizing signal (SOS signal). More specifically, the sensor 82K outputs a signal with a high-level electric potential when the sensor 82K does not receive the beam BK1, and the electric potential of the signal outputted from the sensor 82K becomes a low level when the sensor 82K receives the beam BK1. Then, the control section 30 detects the SOS signal become a low level, and the light source 60K is controlled so as to start emitting the beams BK2 to BK4 to start writing of an electrostatic latent image a specified time after the detection.

The reflective liquid crystal element 84K switches the travel routes of the beams BK1 to BK4 emitted from the light source 60K between a route R1 to the deflector 64 and a route R2 to the sensor 86K. More specifically, the reflective liquid crystal element 84K is located between the collimator lens 61K and the cylindrical lens 62K. While a high-level voltage is applied to the reflective liquid crystal element 84K, the reflective liquid crystal element 84K transmits the beams BK1 to BK4, and the beams BK1 to BK4 travel to the deflector 64. On the other hand, while a low-level voltage is applied to the reflective liquid crystal element 84K, the reflective liquid crystal element 84K reflects the beams BK1 to BK4, and the beams BK1 to BK4 travel to the sensor 86K.

The sensor 86K receives the beams BK1 to BK4 reflected from the reflective liquid crystal element 84K, and generates a detection signal of a voltage depending on the light intensity of the received beams BK1 to BK4. Then, the control section 30 controls the output from the light source 60K (the light intensities of the beams BK1 to BK4) based on the detection signal outputted from the sensor 86K. The structures for irradiation of the photosensitive drums 4Y, 4M and 4C for yellow (Y), magenta (M) and cyan (C) with beams BY, BM and BC, respectively, are the same as the structure for irradiation of the photosensitive drum 4K for black (K) with the beams BK, and descriptions of the structures are omitted.

Operation of the Optical Scanning Device

Figure 3:
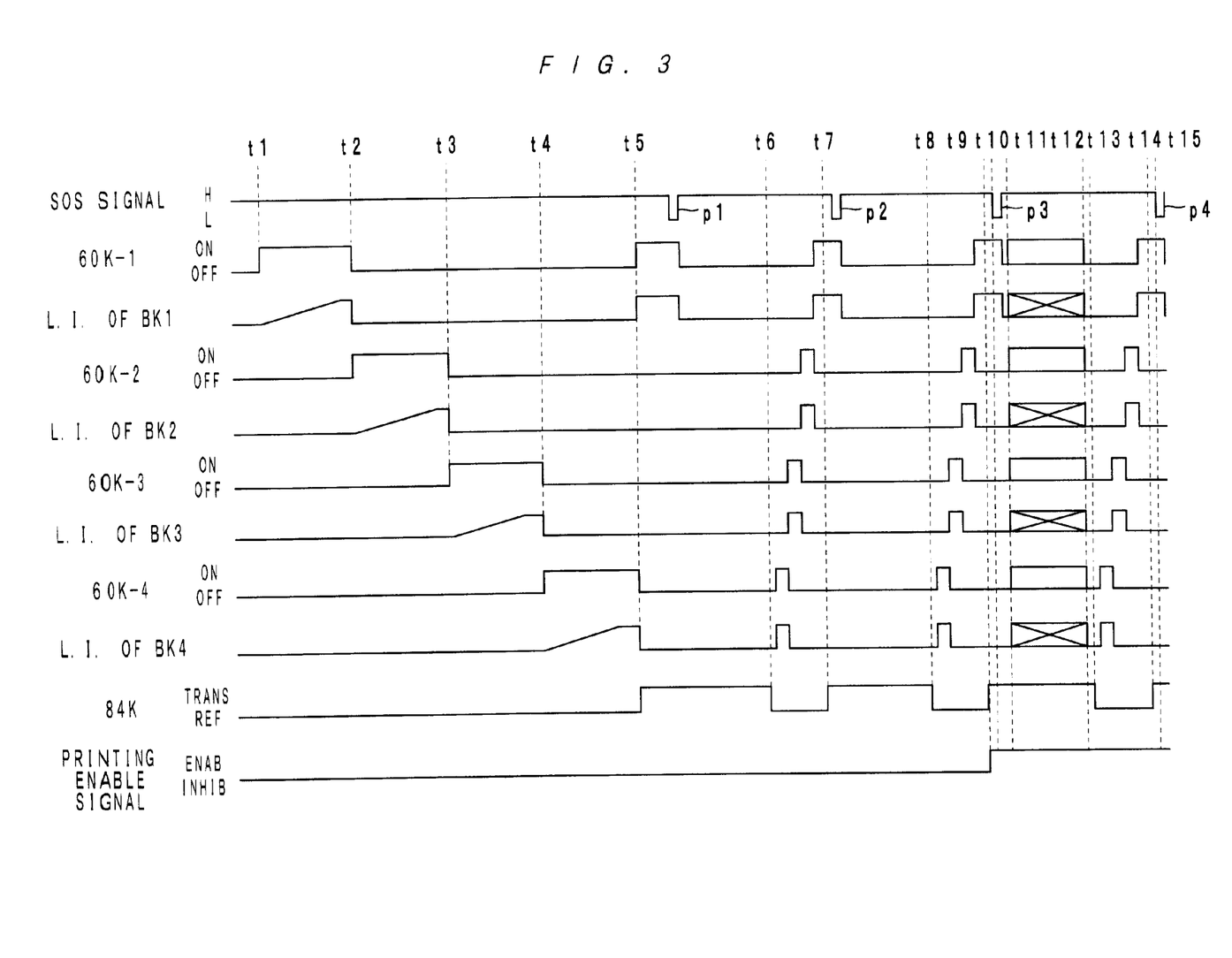
FIG. 3 is a time chart showing operation of the optical scanning device according to the first embodiment for a printing process.

The operation of the optical scanning device 6a is described with reference to the drawings. In the following, the operation that is executed in the structure for irradiation of the photosensitive drum 4K for black (K) with the beams BK after the control section 30 receives a print job until the control section 30 starts a printing process is described. FIG. 3 is a time chart showing actions of the optical scanning device 6a for a printing process.

Upon receiving a print job, the control section 30 controls the output from the light source 60K such that the light intensities of the beams BK1 to BK4 emitted from the emission points 60K-1 to 60K-4 of the light source 60K will become predetermined values. Specifically, the control section 30 first turns the reflective liquid crystal element 84K into a reflecting state and turns a printing enable signal into an inhibiting state. Thereafter, at time t1, the control section 30 turns on the emission point 60K-1, and in response, the emission point 60K-1 emits the beam BK1. The beam BK1 is reflected by the reflective liquid crystal element 84K and enters into the sensor 86K. The light intensity of the beam BK1 received by the sensor 86K becomes higher. Then, upon determining, from the detection signal outputted from the sensor 86K, that the light intensity of the beam BK1 has reached the predetermined value, the sensor 30 turns off the emission point 60K-1 (at time t2).

At time t2, the control section 30 turns on the emission point 60K-2, and in response, the emission point 60K-2 emits the beam BK2. The beam BK2 is reflected by the reflective liquid crystal element 84K and enters into the sensor 86K. The light intensity of the beam BK2 received by the sensor 86K becomes higher. Then, upon determining, from the detection signal outputted from the sensor 86K, that the light intensity of the beam BK2 has reached the predetermined value, the sensor 30 turns off the emission point 60K-2 (at time t3).

At time t3, the control section turns on the emission point 60K-3, and in response, the emission point 60K-3 emits the beam BK3. The beam BK3 is reflected by the reflective liquid crystal element 84K and enters into the sensor 86K. The light intensity of the beam BK3 received by the sensor 86K becomes higher. Then, upon determining, from the detection signal outputted from the sensor 86K, that the light intensity of the beam BK3 has reached the predetermined value, the sensor 30 turns off the emission point 60K-3 (at time t4).

At time t4, the control section 30 turns on the emission point 60K-4, and in response, the emission point 60K-4 emits the beam BK4. The beam BK4 is reflected by the reflective liquid crystal element 84K and enters into the sensor 86K. The light intensity of the beam BK4 received by the sensor 86K becomes higher. Then, upon determining, from the detection signal outputted from the sensor 86K, that the light intensity of the beam BK4 has reached the predetermined value, the sensor 30 turns off the emission point 60K-4 (at time t5). By the above-described actions, the light intensities of the beams BK1 to BK4 emitted from the emission points 60K-1 to 60K-4 of the light source 60K are adjusted to the predetermined values.

At time t5, the control section 30 turns the reflective liquid crystal element 84K into a transmitting state and turns on the emission point 60K-1. Because the reflective liquid crystal element 84K has become the transmitting state, the beam BK1 emitted from the emission point 60K-1 passes through the reflective liquid crystal element 84K and is deflected by the deflector 64. Thereafter, when the beam BK1 enters into the sensor 82K, a low-level pulse p1 is generated in the SOS signal. Then, the emission point 60K-1 is turned off.

At time 6 that is a specified time after the generation of the pulse p1, the reflective liquid crystal element 84K is turned from the transmitting state to the reflecting state by the control section 30 and is kept in the reflecting state until time t7. During this time, the control section 30 turns on the emission points 60K-4, 60K-3, 60K-2 and 60K-1 to emit the beams BK4, BK3, BK2 and BK1 in this order. The beams BK4, BK3, BK2 and BK1 are reflected by the reflective liquid crystal element 84K and enter into the sensor 86K individually in order. The control section 30 adjusts the outputs from the emission points 60K-4, 60K-3, 60K-2 and 60K-1 (the light intensities of the beams BK4, BK3, BK2 and BK1), based on the detection signal outputted from the sensor 86K.

At time t7, the control section 30 turns the reflective liquid crystal element 84K from the reflecting state to the transmitting state. In this moment, the emission point 60K-1 is kept on by the control section 30 to keep emitting the beam BK1. Accordingly, the beam BK1 is deflected by the deflector 64. Then, when the beam BK1 enters into the sensor 82K, a low-level pulse p2 is generated in the SOS signal. Then, the emission point 60K-1 is turned off.

At time t8 that is a specified time after the generation of the pulse p2, the reflective liquid crystal element 84K is turned from the transmitting state to the reflecting state by the control section 30 and is kept in the reflecting state until time t9. During this time, the control section 30 turns on the emission points 60K-4, 60K-3, 60K-2 and 60K-1 to emit the beams BK4, BK3, BK2 and BK1 in this order. The beams BK4, BK3, BK2 and BK1 are reflected by the reflective liquid crystal element 84K and enter into the sensor 86K individually in order. The control section 30 adjusts the outputs from the emission points 60K-4, 60K-3, 60K-2 and 60K-1 (the light intensities of the beams BK4, BK3, BK2 and BK1), based on the detection signal outputted from the sensor 86K.

At time t9, the control section 30 turns the reflective liquid crystal element 84K into the transmitting state and turns the printing enable signal into an enabling state. In this moment, the emission point 60K-1 is kept on by the control section 30 to keep emitting the beam BK1. Accordingly, the beam BK1 is deflected by the deflector 64. Then, when the beam BK1 enters into the sensor 82K, a low-level pulse p3 is generated in the SOS signal (at time t10). The adjustment of the outputs from the emission points 60K-1 to 60K-4 executed between the generation of the pulse p1 and the generation of the pulse p2 and adjustments of the outputs from the emission points 60K-1 to 60K-4 executed between the generation of the pulse p2 and the generation of the pulse p3 include substantially the same actions. Thus, the optical scanning device 6a gets ready for a printing process through the actions from time t1 until time t10.

From time t11 (a specified time after t10) until time t12, the control section 30 makes the emission points 60K-1 to 60K-4 emit the beams BK1 to BK4 in accordance with image data. During this time, the reflective liquid crystal element 84K is kept in the transmitting state, and the beams BK1 to BK4 are deflected by the deflector 64 and scanned on the peripheral surface of the photosensitive drum 4K. Thereby, from time t11 until time t12, three lines of an electrostatic latent image are written on the photosensitive drum 4K. Thereafter, at time t13, the control section 30 turns the reflective liquid crystal element 84K from the transmitting state to the reflecting state. From time t13 until time t15, the same actions executed from time t8 until time t10 are executed, and descriptions of the actions are omitted. On and after time t15, the same actions executed from time t10 until time t15 are repeated, and thereby, an electrostatic latent image is formed three lines at a time.

Advantages

In the optical scanning device 6a of the above-described structure, the beams deflected by the deflector 64 can be prevented from reducing in light intensity. In the optical scanning device disclosed by 2002-40350, on the other hand, each of a plurality of beams emitted from a surface-emitting laser is partly reflected by a half mirror and directed to a light receiving element, and therefore, the beams deflected by a polygon mirror reduces in light intensity, compared with the beams immediately after emitted from the surface-emitting laser, by the light intensity reflected by the half mirror.

More specifically, in the optical scanning device 6a, the reflective liquid crystal element 84K switches the travel routes of the beams BK1 to BK4 emitted from the light source 60K between the route R1 to the deflector 64 and the route R2 to the sensor 86K. The control section 30 keeps the reflective liquid crystal element 84K in a transmitting state for generations of pulses in the SOS signal and formation of an electrostatic latent image, and keeps the reflective liquid crystal element 84K in a reflecting state for adjustments of the outputs from the emission points 60K-1 to 60K-4. With this control, it does not occur that the light intensities of the beams BK1 to BK4 for generations of pulses in the SOS signal and formation of an electrostatic latent image decrease due to reflection of the beams BK1 to BK4 by the reflective liquid crystal element 84K. Thus, in the optical scanning device 6a, the beams deflected by the deflector 64 can be prevented from reducing in light intensity.

When a surface-emitting laser is used in the optical scanning device 60a as the light source 60K, the advantage is remarkable. Ordinary lasers emit two beams traveling forward and backward, respectively. When such an ordinary laser is used in an optical scanning device, one of the beams is used for formation of an electrostatic latent image and generations of pulses in an SOS signal, and the other is used for adjustment of the output from the light source. Therefore, in such an optical scanning device using an ordinary laser as a light source, it is not necessary to adjust the output from the light source by splitting the beams and/or by switching the travel routes of the beams.

On the other hand, surface-emitting lasers emit beams in one direction. When such a surface-emitting laser is used in an optical scanning device as a light source, the beams emitted in one direction must be used both for formation of an electrostatic latent image and generations of pulses in an SOS signal and for adjustment of the output from the light source. Therefore, in such an optical scanning device, it is necessary to adjust the output from the light source by splitting the beams and/or by switching the travel routes of the beams. In the optical scanning device 6a, the travel routes of the beams BK1 to BK4 are switched by the reflective liquid crystal element 84K. Thereby, in the optical scanning device 6a, although a surface-emitting laser is used as the light source 60K, it does not occur that the beams deflected by the deflector 64 reduce in light intensity.

Moreover, for the following reason, the advantage is remarkable when a surface-emitting laser is used as the light source 60K in the optical scanning device 60a. Surface-emitting lasers emit beams with less light intensities compared with ordinary lasers. Therefore, when a surface-emitting laser is used as the light source in an optical scanning device, the problem of reductions in light intensity of beams deflected by a deflector is more significant. In such a case, by using the reflective liquid crystal element 84K as a switching element for switching the travel routes of the beams BK1 to BK4, the problem of reduction of the beams in light intensity can be effectively prevented.

Modification

Figure 4:
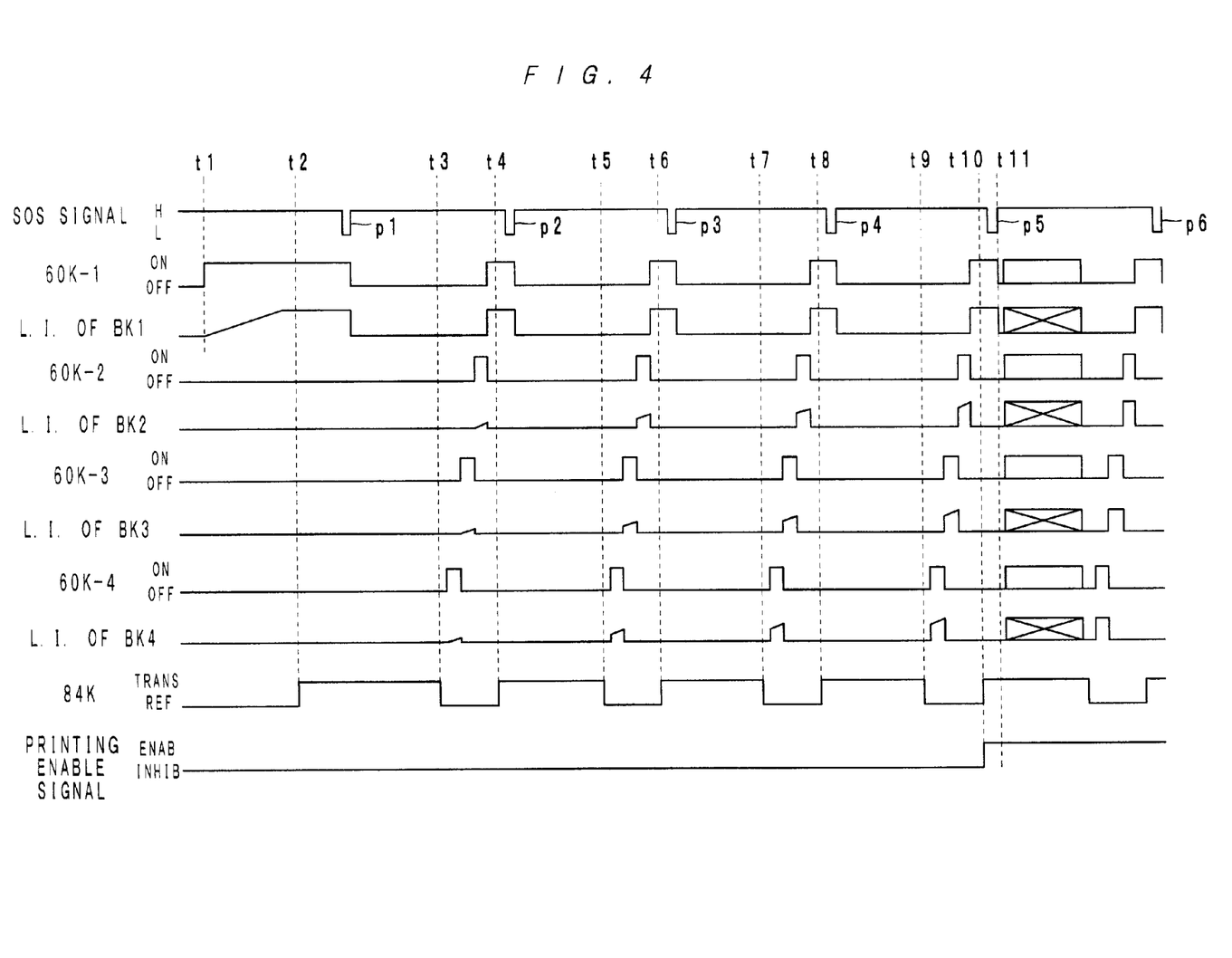
FIG. 4 is a time chart showing a modification of the operation of the optical scanning device according to the first embodiment for a printing process.

A modification of the operation of the optical scanning device 6a is described with reference to the drawings. FIG. 4 is a time chart showing modified actions of the optical scanning device 6a for a printing process.

Upon receiving a print job, the control section 30 controls the output from the light source 60K such that the light intensities of the beams BK1 to BK4 emitted from the emission points 60K-1 to 60K-4 of the light source 60K will become predetermined values. Specifically, the control section 30 first turns the reflective liquid crystal element 84K into a reflecting state and turns a printing enable signal into an inhibiting state. Thereafter, at time t1, the control section 30 turns on the emission point 60K-1, and in response, the emission point 60K-1 emits the beam BK1. The BK1 is reflected by the reflective liquid crystal element 84K and enters into the sensor 86K. The light intensity of the beam BK1 received by the sensor 86K becomes higher. Then, upon determining, from the detection signal outputted from the sensor 86K, that the light intensity of the beam BK1 has reached a predetermined value, the sensor 30 turns the reflective liquid crystal element 84K to a transmitting state (at time t2).

At time t2, the emission point 60K-1 is on, and therefore, the beam BK1 is deflected by the deflector 64. Then, when the beam BK1 enters into the sensor 82K, a low-level pulse p1 is generated in the SOS signal. Then, the emission point 60K-1 is turned off.

At time t3 that is a specified time after the generation of the pulse p1, the reflective liquid crystal element 84K is turned from the transmitting state to the reflecting state by the control section 30 and is kept in the reflecting state until time t4. During this time, the control section 30 turns on the emission points 60K-4, 60K-3, 60K-2 and 60K-1 in this order, and the beams BK4, BK3, BK2 and BK1 emitted from the emission points 60K-4, 60K-3, 60K-2 and 60K-1 are reflected by the reflective liquid crystal element 84K and enter into the sensor 86K individually in order. In this stage, the emission points 60K-1 to 60K-4 emit the beams BK1 to BK4 for a very short time, and therefore, the light intensities of the beams BK2 to BK4 cannot reach the predetermined values. With respect to the beam BK1, however, because the adjustment was completed at time t2, the light intensity reaches the predetermined value.

At time t4, the control section 30 turns the reflective liquid crystal element 84K to the transmitting state and keeps the emission point 60K-1 on, and therefore, the beam BK1 is deflected by the deflector 64. Then, when the beam BK1 enters into the sensor 82K, a low-level pulse p2 is generated in the SOS signal. Thereafter, the actions executed between the generations of pulses p1 and p2 are repeated between pulses p2 and p3, between pulses p3 and p4 and between pulses p4 and p5. In this way, the light intensities of the beams BK2 to BK4 are adjusted to the predetermined values.

Then, between pulses p5 and p6, the control section 30 controls the optical scanning device 6a such that three lines of an electrostatic latent image are written on the photosensitive drum 4K. The actions of the optical scanning device 6a between the pulses p5 and p6 in FIG. 4 are the same as the actions of the optical scanning device 6a between the pulses p3 and p4 in FIG. 3, and descriptions of the actions between the pulses p5 and p6 in FIG. 4 are omitted.

Also in the optical scanning device 6a operating in this way, the beams deflected by the deflector 64 can be prevented from reducing in light intensity.

Second Embodiment

Structure of the Optical Scanning Device

Figure 5:
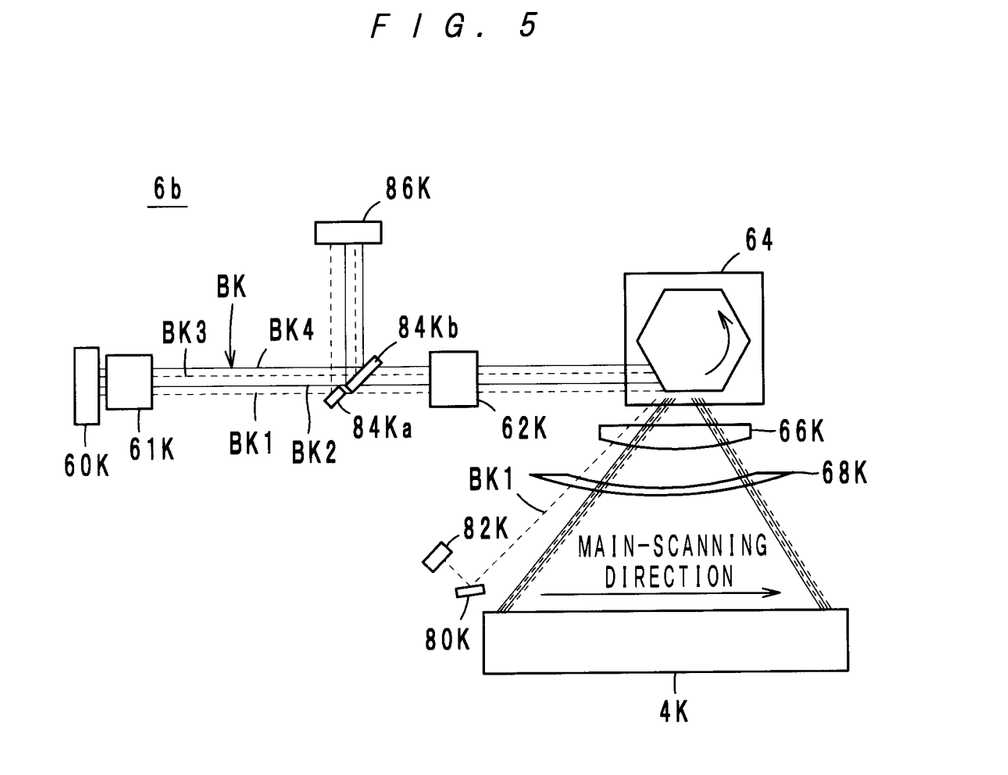
FIG. 5 is an illustration showing the structure of an optical scanning device according to a second embodiment.

Next, an optical scanning device 6b according to a second embodiment of the present invention will be described with reference to the accompanying drawings. FIG. 5 shows the structure of the optical scanning device 6b. FIG. 5 shows only the structure for irradiating the photosensitive drum 4K for black with beams BK. Also, the optical scanning device 6b actually has optical elements such as mirrors, but the optical elements are omitted from FIG. 5 to simplify the illustration.

The optical scanning device 6b is different from the optical scanning device 6a in that the device 6b has reflective liquid crystal elements 84Ka and 84Kb. The reflective liquid crystal element 84Ka switches the travel route of the beam BK1 used for generations of pulses in the SOS signal. The reflective liquid crystal element 84Kb switches the travel routes of the other beams BK2 to BK4. Thereby, in the optical scanning device 6b, the travel route of the beam BK1 can be switched independently of the other beams BK2 to BK4. The other components of the optical scanning device 6b are the same as those of the optical scanning device 6a, and descriptions of these components are omitted.

Operation of the Optical Scanning Device

Figure 6:
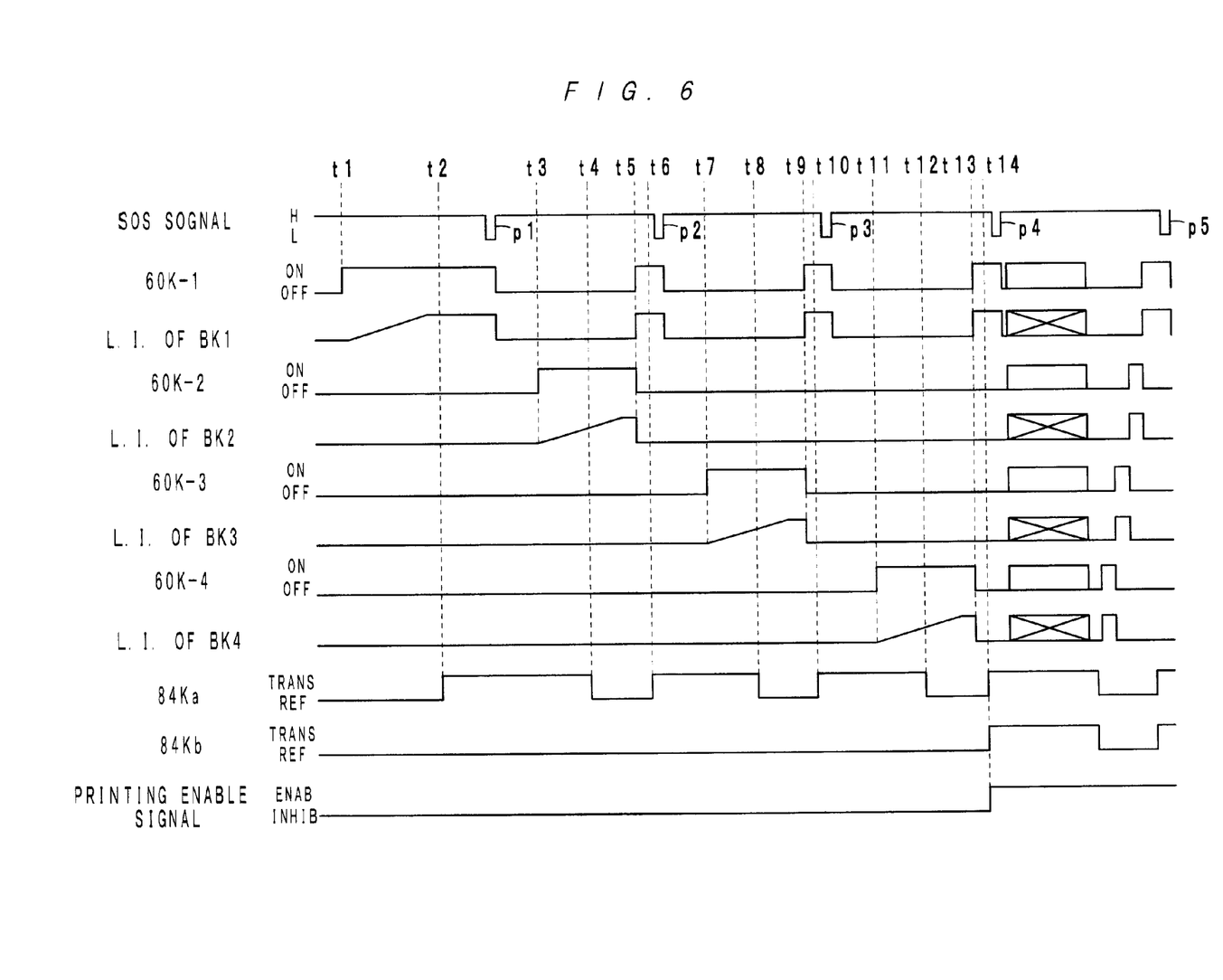
FIG. 6 is a time chart showing operation of the optical scanning device according to the second embodiment for a printing process.

The operation of the optical scanning device 6a is described with reference to the drawings. In the following, the operation that is executed in the structure for irradiation of the photosensitive drum 4K for black (K) with the beams BK after the control section 30 receives a print job until the control section 30 starts a printing process is described. FIG. 6 is a time chart showing actions of the optical scanning device 6b for a printing process.

Upon receiving a print job, the control section 30 controls the output from the light source 60K such that the light intensities of the beams BK1 to BK4 emitted from the emission points 60K-1 to 60K-4 of the light source 60K will become predetermined values. Specifically, the control section 30 first turns the reflective liquid crystal elements 84Ka and 84Kb into a reflecting state and turns a printing enable signal into an inhibiting state. Thereafter, at time t1, the control section 30 turns on the emission point 60K-1, and in response, the emission point 60K-1 emits the beam BK1. The BK1 is reflected by the reflective liquid crystal element 84K and enters into the sensor 86K. The light intensity of the beam BK1 received by the sensor 86K becomes higher. Then, upon determining, from the detection signal outputted from the sensor 86K, that the light intensity of the beam BK1 has reached the predetermined value, the sensor 30 turns the reflective liquid crystal element 84Ka into a transmitting state (at time t2).

At time t2, the emission point 60K-1 is kept on by the control section 30, and therefore, the beam BK1 passes through the reflective liquid crystal element 84Ka and is deflected by the deflector 64. Then, when the beam BK1 enters into the sensor 82K, a low-level pulse p1 is generated in the SOS signal. Then, the emission point 60K-1 is turned off.

At time t3, the control section 30 turns on the emission point 60K-2, and in response, the emission point 60K-2 emits the beam BK2. In this moment, the reflective liquid crystal element 84Kb is in the reflecting state, and the beam BK2 is reflected by the reflective liquid crystal element 84Kb and enters into the sensor 86K. Thereafter, the light intensity of the beam BK2 received by the sensor 86K becomes higher.

At time t4, the control section 30 turns the reflective liquid crystal element 84Ka into the reflecting state. Thereafter, upon determining, from the detection signal outputted from the sensor 86K, that the light intensity of the beam BK2 has reached the predetermined value, the sensor 30 turns off the emission point 60K-2 (at time t5). At time t5, the emission point 60K-1 is turned on.

At time t6, the control section turns the reflective liquid crystal element 84Ka into the transmitting state. At this time, the emission point 60K-1 is on, and the beam BK1 passes through the reflective liquid crystal element 84Ka and is deflected by the deflector 64. Then, when the beam BK1 enters into the sensor 82K, a low-level pulse p2 is generated in the SOS signal. Then, the emission point 60K-1 is turned off.

At time t7, the control section 30 turns on the emission point 60K-3, and in response, the emission point 60K-3 emits the beam BK3. In this moment, the reflective liquid crystal element 84Kb is in the reflecting state, and the beam BK3 is reflected by the reflective liquid crystal element 84Kb and enters into the sensor 86K. Thereafter, the light intensity of the beam BK3 received by the sensor 86K becomes higher.

At time t8, the control section 40 turns the reflective liquid crystal element 84Ka into the reflecting state. Thereafter, upon determining, from the detection signal outputted from the sensor 86K, that the light intensity of the beam BK3 has reached the predetermined value, the sensor 30 turns off the emission point 60K-3 (at time t9). At time t9, the emission point 60K-1 is turned on.

At time t10, the control section 30 turns the reflective liquid crystal element 84Ka into the transmitting state. In this moment, the emission point 60K-1 is on, and the beams BK1 passes through the reflective liquid crystal element 84Ka and is deflected by the deflector 64. Then, when the beam BK1 enters into the sensor 82K, a low-level pulse p3 is generated in the SOS signal. Then, the emission point 60K-1 is turned off.

At time t11, the control section 30 turns on the emission point 60K-4, and in response, the emission point 60K-4 emits the beam BK4. The reflective liquid crystal element 84Kb is in the reflecting state, and therefore, the beam BK4 is reflected by the reflective liquid crystal element 84Kb and enters into the sensor 86K. Thereafter, the light intensity of the beam BK4 received by the sensor 86K becomes higher.

At time t12, the control section 30 turns the reflective liquid crystal element 84Ka into the reflecting state. Thereafter, upon determining, from the detection signal outputted from the sensor 86K, that the light intensity of the beam BK4 has reached the predetermined value, the sensor 30 turns off the emission point 60K-4 (at time t13). At time t13, the emission point 60K-1 is turned on.

At time t14, the control section 30 turns the reflective liquid crystal elements 84Ka and 84Kb into the transmitting state and turns the printing enable signal into the enabling state. In this moment, the emission point 60K-1 is on, and the beam BK1 passes through the reflective liquid crystal element 84Ka and is deflected by the deflector 64. Then, when the beam BK1 enters into the sensor 84K, a low-level pulse p4 is generated in the SOS signal. Through the actions above, the light intensities of the beams BK1 to BK4 emitted from the emission points 60K-1 to 60K-4 of the light source 60K are adjusted to the predetermined values.

Thereafter, between pulses p4 and p5, the control section 30 controls the optical scanning device 6b such that three lines of an electrostatic latent image are written on the photosensitive drum 4K. The actions of the optical scanning device 6b between the pulses p4 and p5 in FIG. 6 are the same as the actions of the optical scanning device 6b between the pulses p3 and p4 in FIG. 3, and descriptions of the actions between the pulses p5 and p6 in FIG. 4 are omitted.

Advantages

Like in the optical scanning device 6a, in the optical scanning device 6b that operates in the above-described way, the beams deflected by the deflector 64 can be prevented from reducing in light intensity.

In the optical scanning device 6b, further, the preparation period (from time t1 to time t14 in FIG. 6) required for the adjustments of the light intensities of the beams BK1 to BK4 emitted from the emission points 60K-1 to 60K-4 of the light source 60K and for preliminary generations of pulses in the SOS signal can be shortened. In the optical scanning devices 6a and 6b, from the view point of shortening of the preparation period, it is undesired that the beams BK1 to BK4 are scanned on the peripheral surface of the photosensitive drum 4K during the preparation period. In the optical scanning device 6a having only one reflective liquid crystal element 84K, in order to shorten the preparation period, the light intensities of the beams BK1 to BK4 are adjusted to the predetermined values first, as shown in FIG. 3.

In the operation shown by FIG. 3, the control section 30 does not start actions for generations of pulses in the SOS signal until the adjustments of the light intensities of the beams BK1 to BK4 are completed. Due to the delay of the generations of pulses, the synchronization timing in the optical scanning device 6a is delayed. Accordingly, the optical scanning device 6a needs a long preparation period.

As shown in FIG. 4, it is possible to control the optical scanning device 6a such that the periods wherein the beams BK1 to BK4 are not scanned on the peripheral surface 4K are used for the adjustments of the light intensities of the beams BK1 to BK4.

In the case of FIG. 4, the emission points 60K-1 to 60K-4 are turned on and immediately turned off by the control section 30, and the turn-ons and turn-offs are repeated. Accordingly, in this case also, the optical scanning device 6a needs a long preparation period.

In the optical scanning device 6b, on the other hand, because two reflective liquid crystal elements 84Ka and 84Kb are provided, it is possible to switch the travel route of the beam BK1 independently of the other beams BK2 to BK4. Thereby, for example, the following actions become possible: the light intensity of the beam BK2 is adjusted with the reflective liquid crystal element 84Kb kept in the reflecting state from time t3 to time t5; and immediately after that (at time t6), the reflective liquid crystal element 84Ka is turned from the reflecting state to the transmitting state so as to cause the beam BK1 to enter into the sensor 82K, thereby resulting in the generation of pulse p2 in the SOS signal. Thus, in the optical scanning device 6b, it is possible to generate a pulse immediately after the adjustment of the light intensity of each of the beams BK1 to BK4 is completed. Accordingly, the optical scanning device 6b needs a shorter preparation period, compared with the optical scanning device 6a.

Third Embodiment

Structure of the Optical Scanning Device

Figure 7:
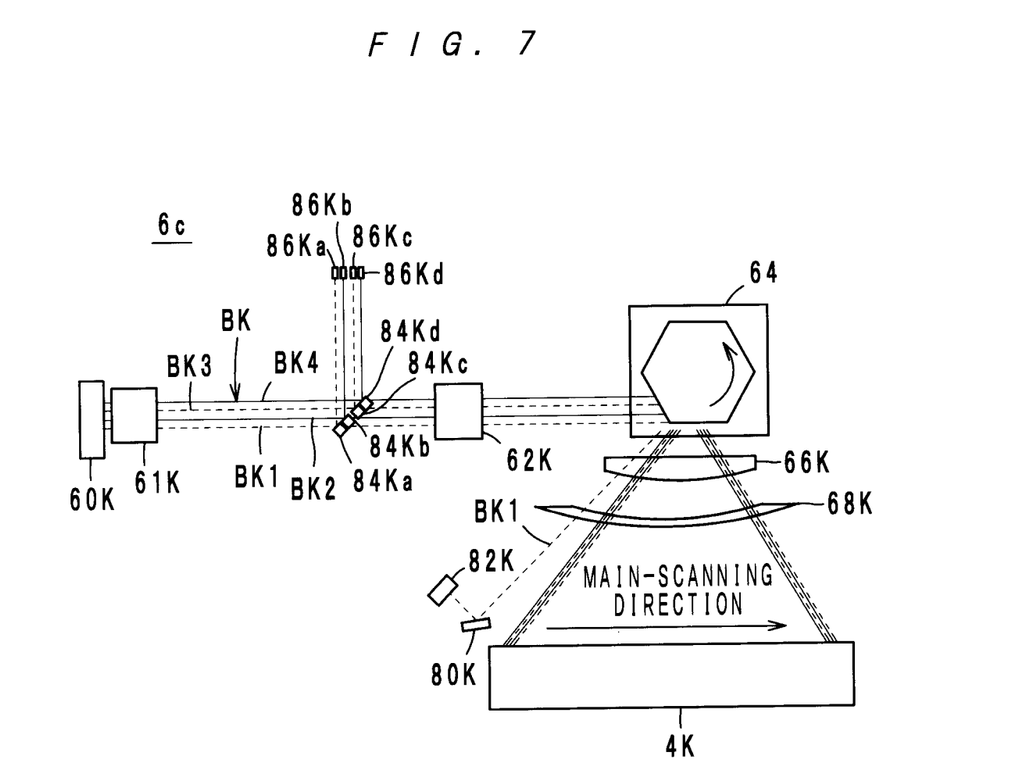
FIG. 7 is an illustration showing the structure of an optical scanning device according to a third embodiment.

Next, an optical scanning device 6c according to a third embodiment of the present invention will be described with reference to the drawings. FIG. 7 shows the structure of the optical scanning device 6c. FIG. 7 shows only the structure for irradiating the photosensitive drum 4K for black with beams BK. Also, the optical scanning device 6b actually has optical elements such as mirrors, but the optical elements are omitted from FIG. 7 to simplify the illustration.

The optical scanning device 6c is different from the optical scanning device 6a in that the optical scanning device 6c has reflective liquid crystal elements 84Ka to 84kd and sensors 86Ka to 86Kd. The reflective liquid crystal elements 84Ka to 84kd are located in the paths of the beams BK1 to BK4, respectively, and switch the respective travel routes of the beams BK1 to BK4. Thus, in the optical scanning device 6c, the travel routes of the beams BK1 to BK4 can be switched independently of one another. The sensors 86Ka to 86Kd receive the beams BK1 to BK4, respectively. The other components of the optical scanning device 6c are the same as those of the optical scanning device 6a, and descriptions thereof are omitted.

Operation of the Optical Scanning Device

Figure 8:
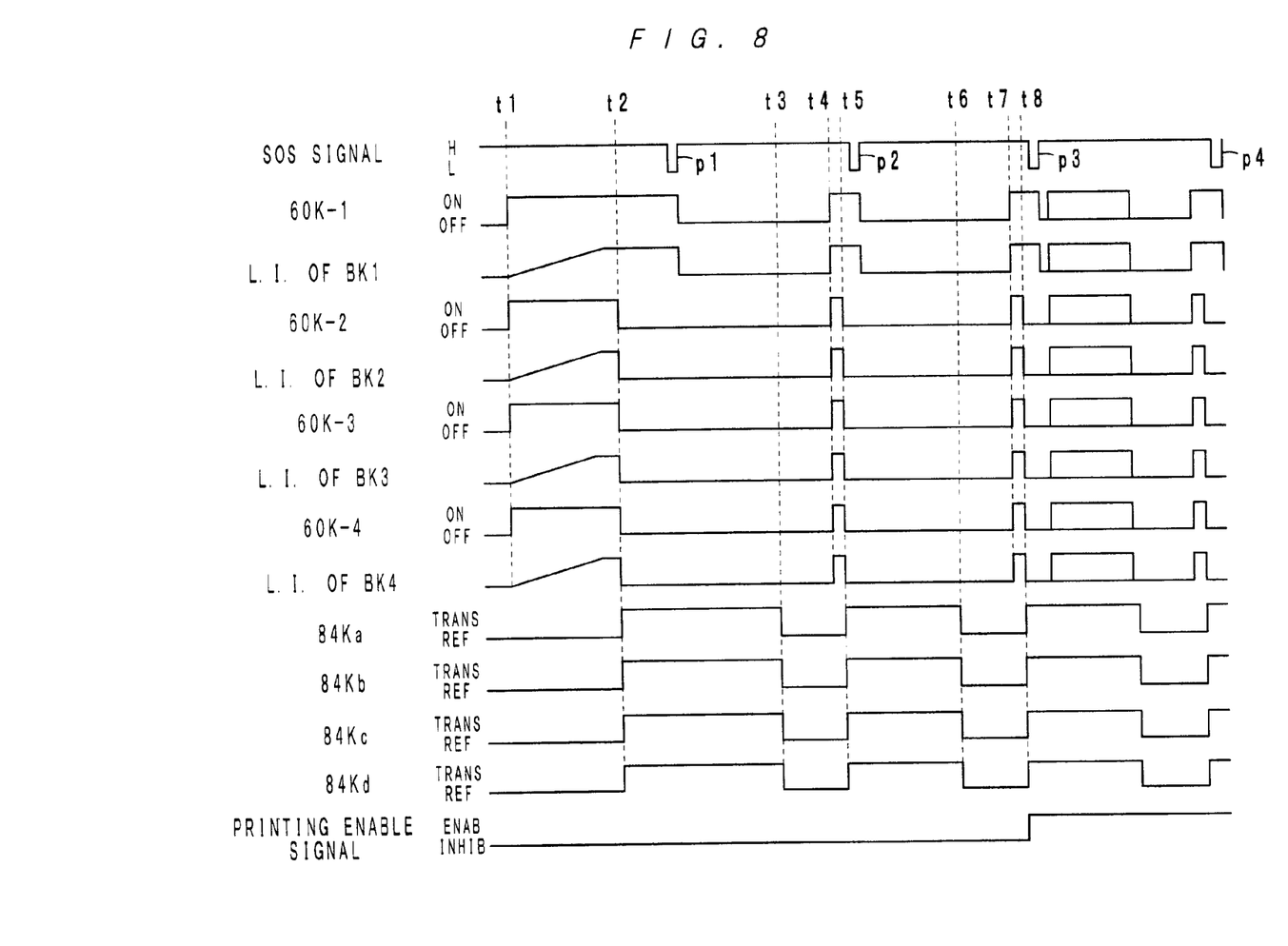
FIG. 8 is a time chart showing operation of the optical scanning device according to the third embodiment for a printing process.

The operation of the optical scanning device 6a is described with reference to the drawings. In the following, the operation that is executed in the structure for irradiation of the photosensitive drum 4K for black (K) with the beams BK after the control section 30 receives a print job until the control section 30 starts a printing process is described. FIG. 8 is a time chart showing actions of the optical scanning device 6c for a printing process.

Upon receiving a print job, the control section 30 controls the output from the light source 60K such that the light intensities of the beams BK1 to BK4 emitted from the emission points 60K-1 to 60K-4 of the light source 60K will become predetermined values. First, the control section 30 turns the reflective liquid crystal elements 84Ka to 84Kd into a reflecting state and turns the printing enable signal into an inhibiting state. Then, at time t1, the control section 30 turns on the emission points 60K-1 to 60K-4, and in response, the emission points 60K-1 to 60K-4 emit beams BK1 to BK4. Since the reflective liquid crystal elements 84Ka to 84Kd are in the reflecting state, the beams BK1 to BK4 are reflected by the reflective liquid crystal elements 84Ka to 84Kd, respectively, and enter into the sensors 86Ka to 86Kd, respectively. The light intensities of the beams BK1 to BK4 received by the sensors 86Ka to 86Kd become higher. Thereafter, upon determining from the detection signals outputted from the sensors 86Ka to 86Kd that the light intensities of the beams BK2 to BK4 have reached the predetermined values, the control section 30 turns off the emission points 60K-2 to 60K-4 (at time t2). At time t2, further, the control section 30 turns the reflective liquid crystal elements 84Ka to 84Kd into a transmitting state. At time t2, the emission point 60K-1 is kept on.

The reflective liquid crystal elements 84Ka to 84Kd are in the transmitting state, and the beam BK1 is deflected by the deflector 64. Then, when the beam BK1 enters into the sensor 82K, a low-level pulse p1 is generated in the SOS signal. Through these actions, the light intensities of the beams BK1 to BK4 emitted from the emission points 60K-1 to 60K-4 are adjusted to the predetermined values.

At time t3, the control section 30 turns the reflective liquid crystal elements 84Ka to 84Kd into the reflecting state. Thereafter, at time t4, the control section 30 makes the emission points 60K-1 to 60K-4 emit the beams BK1 to BK4 concurrently. The beams BK1 to BK4 are reflected by the reflective liquid crystal elements 84Ka to 84Kd and enter into the sensors 86Ka to 86Kd. The control section 30 adjusts the outputs from the emission points 60K-1 to 60K-4 (the light intensities of the beams BK1 to BK4) on the basis of the detection signals outputted from the sensors 86Ka to 86Kd. Thereafter, at time t5, the control section 30 turns off the emission points 60K-2 to 60K-4 and turns the reflective liquid crystal elements 84Ka to 84Kd into the transmitting state.

The emission point 60K-1 is not turned off at time t5 and kept on. Therefore, the beam BK1 emitted from the emission point 60K-1 passes through the reflective liquid crystal element 84Ka and is deflected by the deflector 64. Then, when the beam BK1 enters into the sensor 82K, a low-level pulse p2 is generated in the SOS signal.

Thereafter, between pulses p2 and p3, the optical scanning device 6c takes the same actions as taken between the pulses p1 and p2, and descriptions of the actions between the pulses p2 and p3 are omitted. Then, between pulses p3 and p4, the control section 30 controls the optical scanning device 6c such that three lines of an electrostatic latent image are written on the photosensitive drum 4K. The process of forming an electrostatic latent image has been already described, and the description thereof is omitted here.

Advantages

Like in the optical scanning device 6a, in the optical scanning device 6c of the above-described structure, the beams deflected by the deflector 64 can be prevented from reducing in light intensity.

In the optical scanning device 6c, further since the sensors 86Ka to 86Kd are disposed to receive the respective beams BK1 to BK4, it is possible that the beams BK1 to BK4 are entered into the sensors 86Ka to 86Kd concurrently. Therefore, as shown in FIG. 8, it is possible to adjust the light intensities of the beams BK1 to BK4 concurrently. Accordingly, the optical scanning device 6c needs a shorter preparation period.

Other Embodiments

In the optical scanning devices 6a to 6c, the reflective liquid crystal elements 84K and 84Ka to 84Kd are used as the switching elements for switching the travel routes of the beams BK1 to BK4. However, the switching elements are not limited to the reflective liquid crystal elements and may be combinations of motors and mirrors. When switching elements of this type are used, the mirrors reflect the beams BK1 to BK4, and the mirrors are moved by motors to cause the beams BK1 to BK4 to travel forward. The switching of the travel routes of the beams BK1 to BK4 may be realized by other mechanisms.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An optical scanning device for scanning a photoreceptor surface with beams, said optical scanning device comprising:
   a surface-emitting laser that emits a plurality of beams in one direction;
   a deflector for deflecting the beams;
   a detector for detecting light intensities of the beams;
   a switch for switching travel routes of the beams between a first route leading from the surface-emitting laser to the deflector and a second route leading from the surface-emitting laser to the detector; and
   a controller for controlling an output from the surface-emitting laser based on the light intensities of the beams detected by the detector,
   wherein the switch comprises:
      a first switching element for switching the travel route of one of the beams that is used for generation of a main-scanning synchronizing signal between the first route leading from the surface-emitting laser to the deflector and the second route leading from the surface-emitting laser to the detector, the first switching element comprising one reflective liquid crystal element; and a second switching element for switching the travel routes of the beams other than the beam used for generation of the main-scanning synchronizing signal between the first route leading from the surface-emitting laser to the deflector and the second route leading from the surface-emitting laser to the detector, the second switching element comprising one reflective liquid crystal element, and wherein the controller individually controls the first and second switching elements to (i) switch from the first route to the second route so as to detect the light intensities of the beams by the detector, and (ii) switch from the second route to the first route so as to scan the photoreceptor surface.

2. The optical scanning device according to claim 1, wherein the detector comprises a plurality of detecting elements for detecting the light intensities of the beams respectively.

3. An image forming apparatus comprising the optical scanning device according to claim 1.

4. The optical scanning device according to claim 1, wherein the beams other than the beam used for generation of the main-scanning synchronizing signal are not incident on the first switching element, and wherein the beam used for generation of the main-scanning synchronizing signal is not incident on the second switching element.

\* \* \* \* \*